J. BARTO.
FLYING MACHINE.
APPLICATION FILED JAN. 19, 1918.

1,299,287.

Patented Apr. 1, 1919.
5 SHEETS—SHEET 1.

WITNESSES
E. Q. Ruppert
Geo. Smith

INVENTOR
John Barto
BY Victor J. Evans
ATTORNEY.

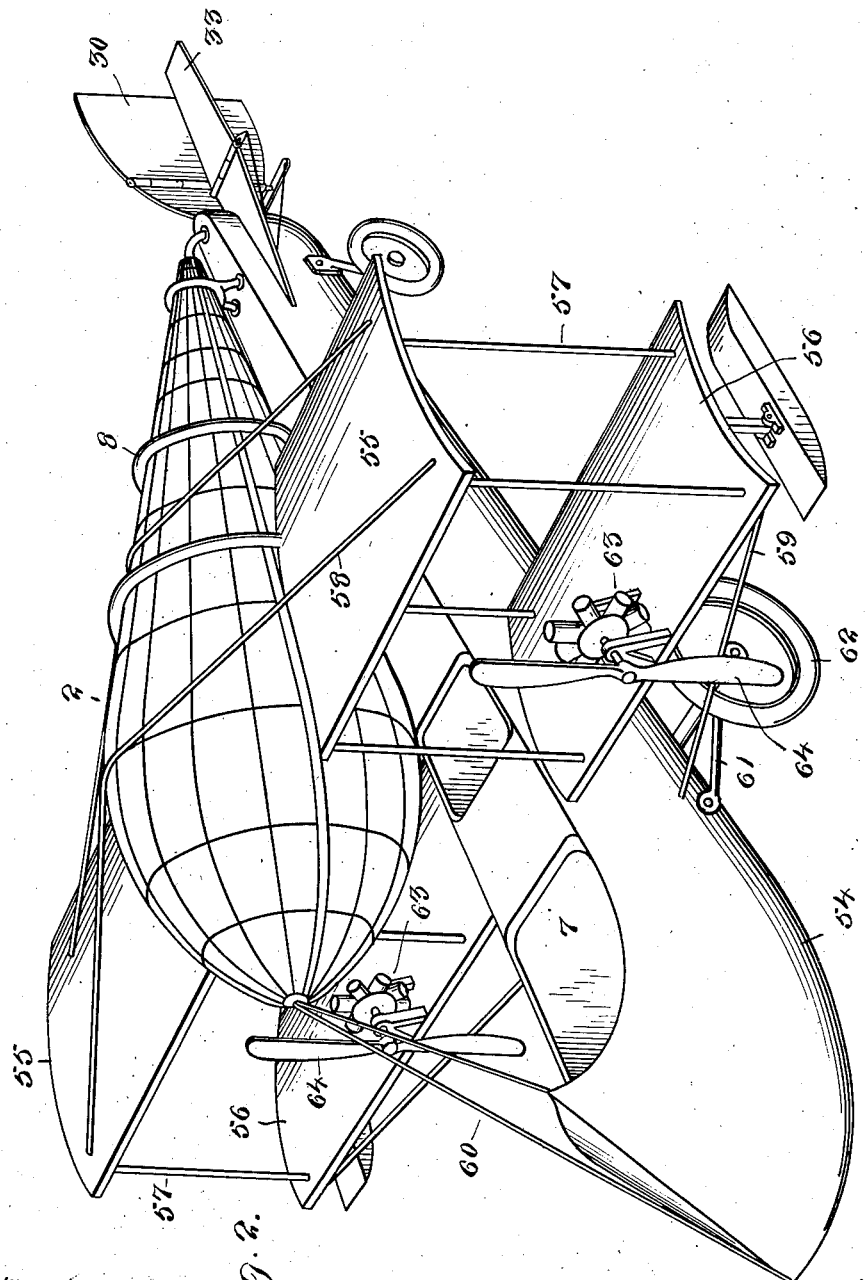

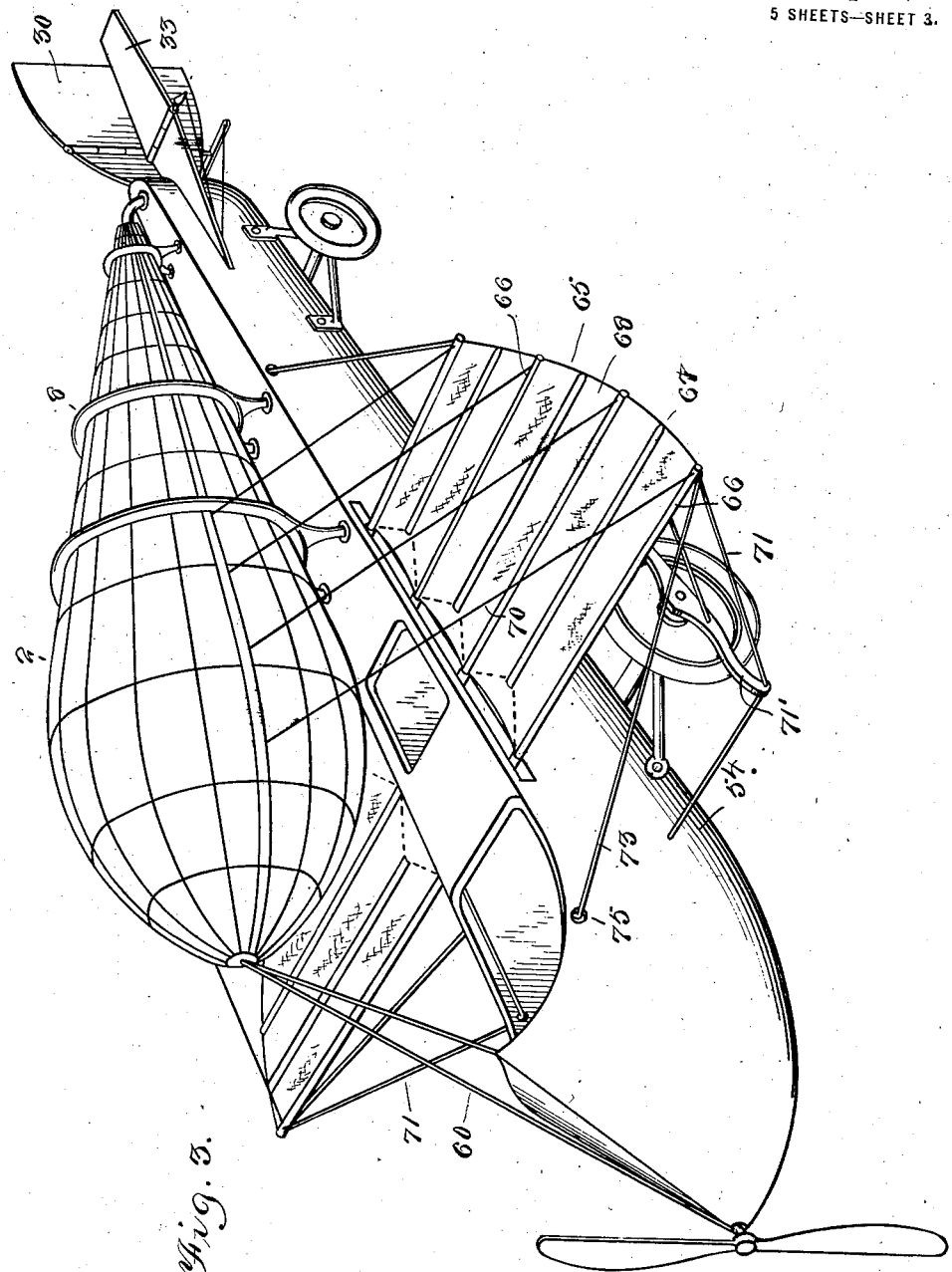

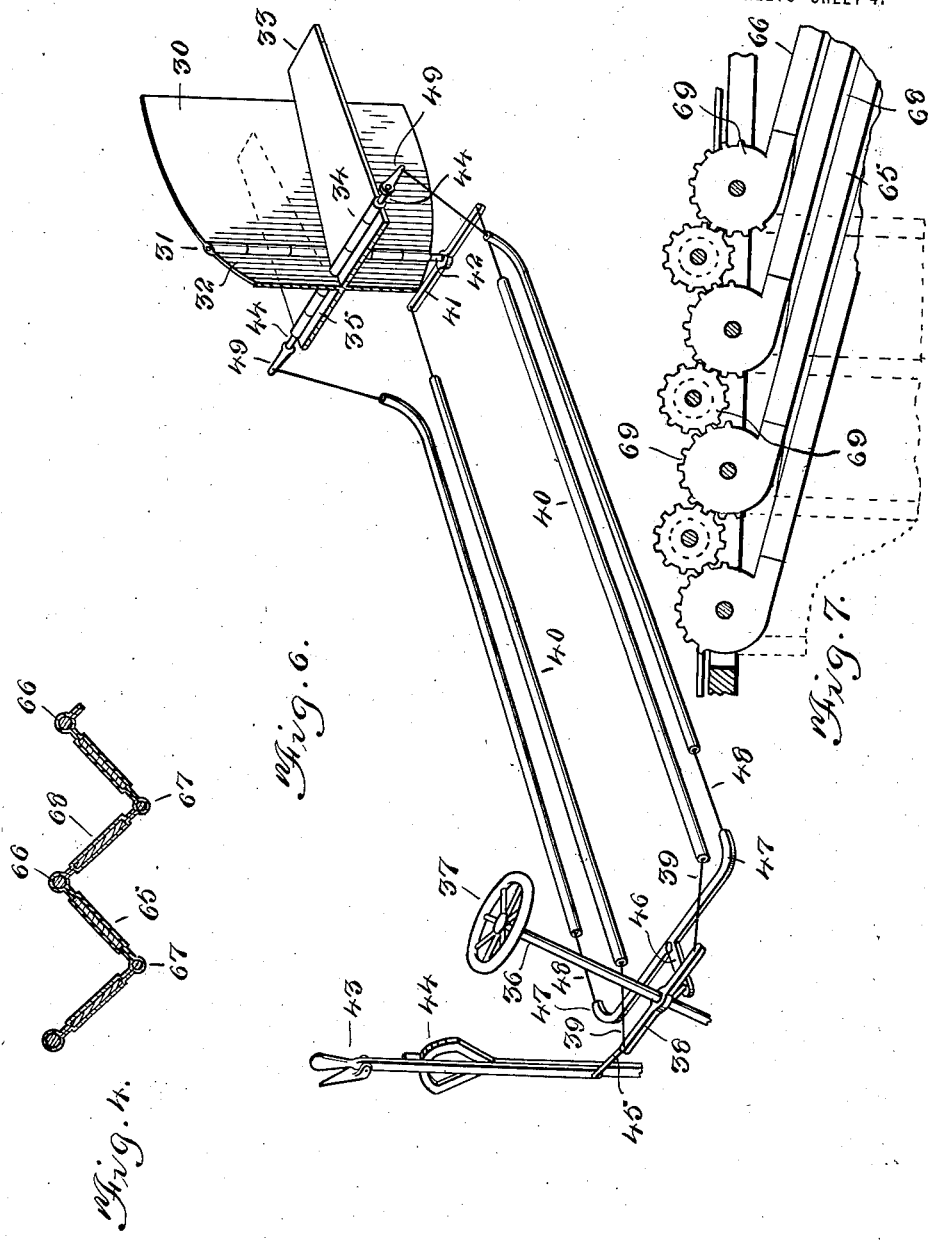

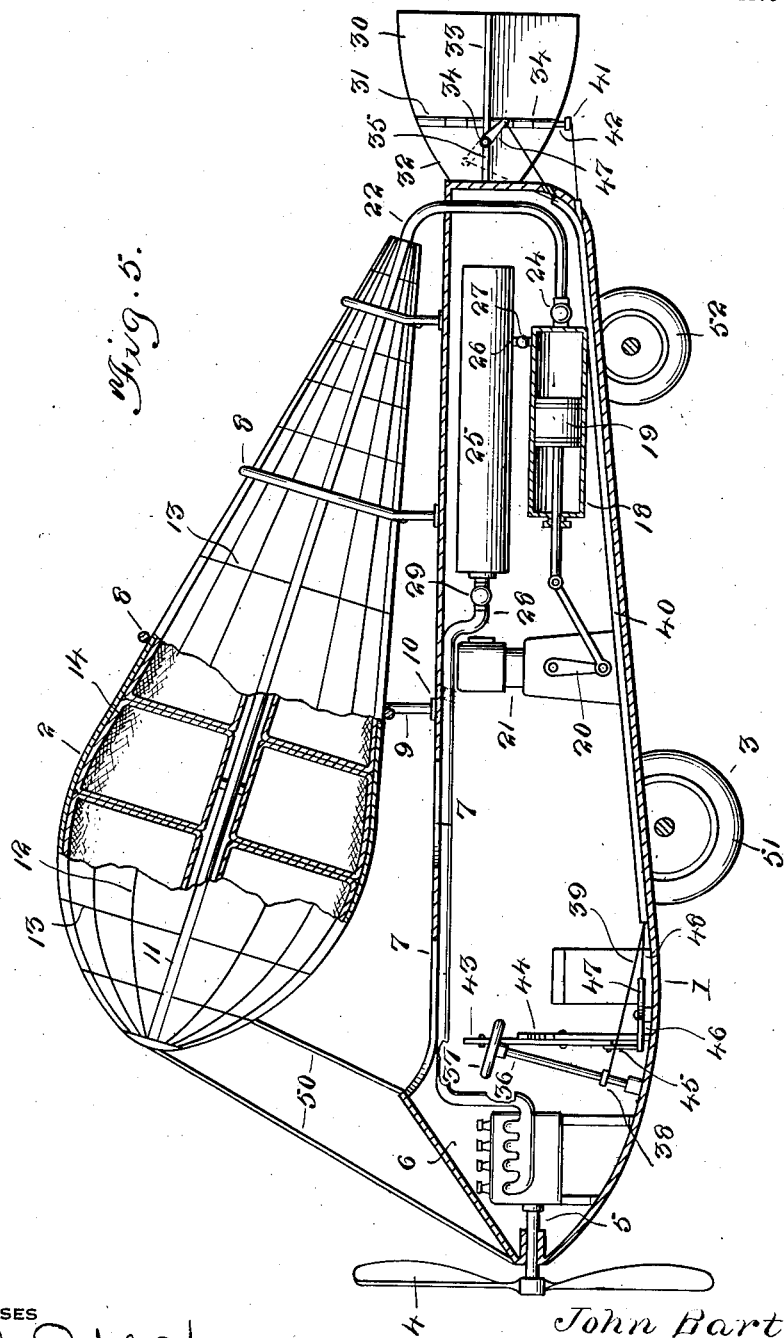

UNITED STATES PATENT OFFICE.

JOHN BARTO, OF CLEVELAND, OHIO.

FLYING-MACHINE.

1,299,287.  Specification of Letters Patent.  Patented Apr. 1, 1919.

Application filed January 19, 1918. Serial No. 212,691.

*To all whom it may concern:*

Be it known that I, JOHN BARTO, a citizen of the United States, residing at Cleveland, in the county of Cuyahoga and State of Ohio, have invented new and useful Improvements in Flying-Machines, of which the following is a specification.

This invention relates to flying machines, the broad object in view being to produce a flying machine having superior flying qualities as compared with the present day heavier than air type of aircraft.

One of the main objects of the present invention is to produce a flying machine having a materially increased lift as compared with the ordinary airplane now in use. This enables wings of smaller size and less spread to be used so that the machine may be housed in a hangar of comparatively small dimensions.

A further object of the invention is to produce a flying machine which may be propelled at a comparatively low speed while sustaining itself perfectly in flight. This commends the machine to beginners and sportsmen who prefer to fly at a comparatively low speed. While the machine is capable of low speed in actual flight, it is also capable of high speed by utilizing the full power of the motor.

A further object of the invention is to produce a machine having an unusual amount of inherent stability both laterally and longitudinally thereby adding materially to the safety of flying.

With the above and other objects in view, the invention consists in the novel construction, combination and arrangement of parts, herein fully described, illustrated and claimed.

In the accompanying drawings:—

Fig. 2 is a perspective view of another form of the machine embodying the same principles but adapted more particularly for water uses.

Fig. 3 is a perspective view of the machine in another form showing certain features which particularly adapt the same for sport purposes.

Fig. 4 is a fragmentary section through one of the wings of the machine shown in Fig. 3.

Fig. 5 is a vertical longitudinal section through the entire machine, showing the interior construction of the aerostat and also the internal mechanism within the fuselage.

Fig. 6 is a detail perspective view of the controlling means for the vertical and horizontal rudders.

Fig. 7 is a fragmentary horizontal section showing the wing folding mechanism.

Figure 1:
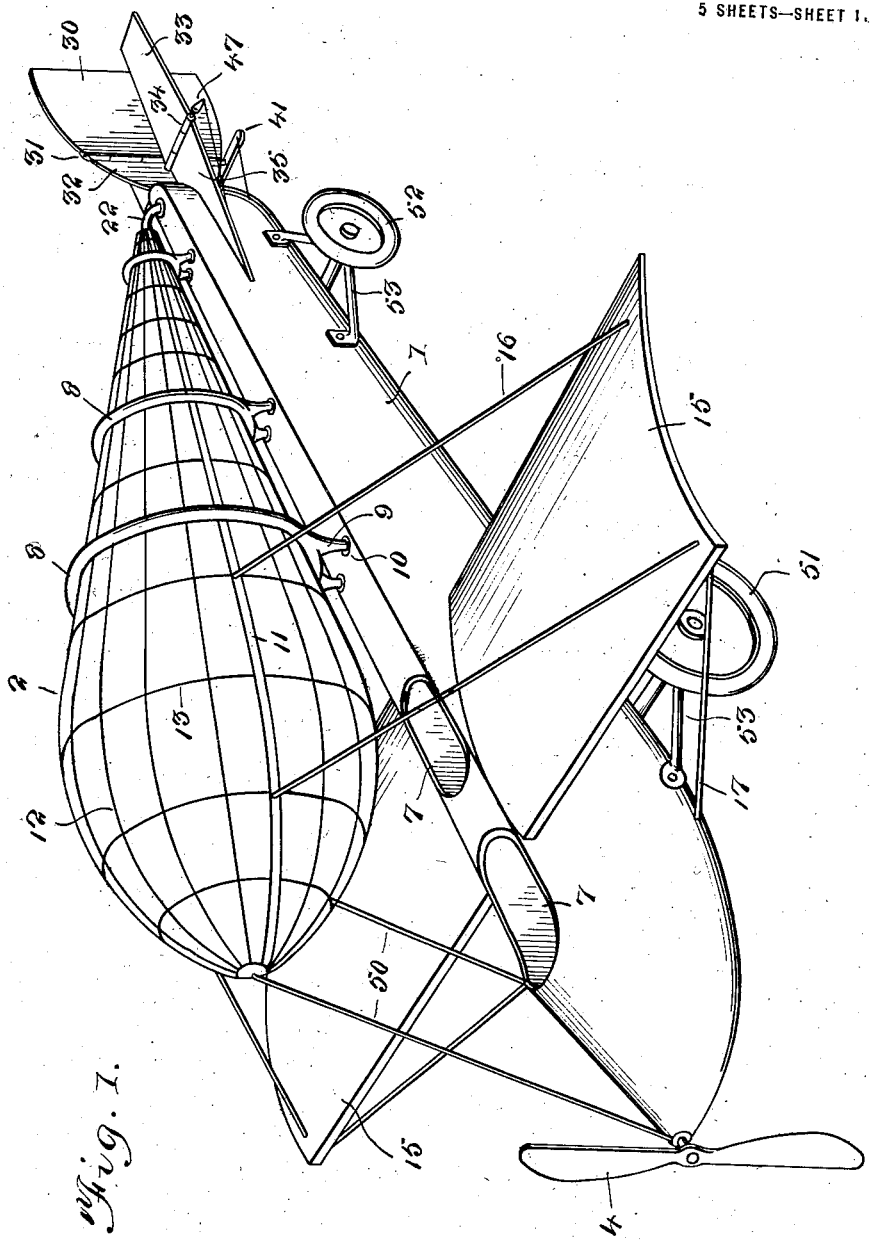
Figure 1 is a perspective view of the improved flying machine especially adapted for landing purposes.

The improved flying machine comprises a body or fuselage 1, a superimposed aerostat 2, a landing base 3, and stabilizing and directional means hereinafter particularly described.

The fuselage 1 is elongated in a fore and aft direction and of streamline formation. I use a traction propeller 4, the shaft 5 of which is driven by an engine 6 located in the forward end of the fuselage. In rear of the engine 6, I provide one or more cock pits 7 for the aviator and one or more passengers.

The aerostat 2 is arranged above and in spaced relation to the fuselage 1 so as to provide ample air currents. Said aerostat is elongated in a fore and aft direction and resembles in shape the ordinary dirigible balloon. Suspension rings 8 encircle the body of the aerostat 2 and each ring is provided with a plurality of body suspension legs 9 which terminate in attached flanges 10 secured to the fuselage 1 by any suitable fastening means. Belly bands 11 extend longitudinally of the aerostat 2 about midway between the top and bottom thereof, said bands being of any suitable tough material such as leather, canvass or light metal. Fore and aft bridal straps 12 extend lengthwise of the aerostat and said straps 12 are crossed by other girth straps 13, the straps 12 and 13 being secured together and to the belly bands 11 to form a net work of large mesh within which the bag of the aerostat is confined. Within the bag of the aerostat there are ballonnets 14 each forming an airtight compartment in itself so that in case of one or more of the ballonnets being punctured or springing a leak from any cause the other ballonnets are intact.

Extending from opposite sides of and attached to the fuselage 1 are wings 15. Flexible stays 16 extend from the outer extremities of the wings to the belly bands 11 and other stays 17 extend from the outer extremities of the wings 15 to the fuselage 1. In this way the wings are effectively braced. Within the fuselage 1, I place a pump comprising a cylinder 18 and a reciprocatory piston 19 which is driven by the crank shaft 20 by a small auxiliary engine 21. The pump cylinder 18 communicates with an elbow 22 which extends through the top of the fuselage 1 and connects with the bag 2 of the aerostat, suitable branch pipes 23 of smaller size extending to the several ballonnets. The elbow 22 is controlled by a back pressure check valve 24. Extending along side of the pump chamber 18 is an accumulation or storage tank 25 which communicates with the pump cylinder 18 by one or more connections 26 each controlled by a back pressure check valve 27. The tank 25 has connected thereto one end of an exhaust gas pipe 28 which connects with the engine 6 and receives the exhaust gas therefrom. A back pressure check valve 29 controls the pipe 28 and prevents the return of exhaust gas from the chamber or tank 25. By reason of the construction just described, while the flying machine is in operation, gas is being constantly pumped to the ballonnets of the aerostat, thus keeping the same constantly inflated with heated gases. This adds greatly to the buoyancy of the aerostat and the lift of the flying machine as a whole.

A vertical rudder 30 is connected by a vertical hinge pin 31 to a fixed vertical fin 32 at the rear end of the fuselage. Horizontal rudder sections 33 are connected by horizontal hinge pins 34 to fixed horizontal fins 35 extending from opposite sides of the rear end portion of the fuselage. The means for controlling the vertical rudder, comprises a rotatable shaft 36 having at the upper end thereof the usual hand controlling wheel 37. To an arm 38 on the shaft 36, I attach a flexible connection 39 such as a cable which extends rearwardly through a guide or fair leader 40 and is attached at its rear extremity to an arm 41 on the post 42 of the vertical rudder 30 hereinabove referred to.

The means for controlling the horizontal rudder sections, comprises a thumb latch lever 43 which coöperates with a holding rack 44. From the lower end of the lever 43 a flexible connection 45 extends to one arm 46 of a three-armed bell crank lever, the other arms 47 of which have attached thereto flexible connections 48 which extend rearwardly where they are attached to posts 49 extending upwardly and downwardly from the pins 44 which constitute rock shafts, the horizontal rudder sections 33 being fixedly connected to said shafts so as to swing when said shafts are rocked in either direction. Stays 50 extend from the forward portion of the fuselage to the belly bands 11 at the forward portion of the aerostat.

The landing base shown in connection with the machine illustrated in Fig. 1, comprises front and rear wheels 51 and 52 the axles of which are carried by hangers 53 attached to the fuselage. The machine hereinabove described is particularly adapted for rising from the ground and landing thereon.

In Fig. 2, I have illustrated the invention as applied to a machine adapted to rise from and alight upon the water. In place of the fuselage 1 of Fig. 1, I employ a body 54 in the form of a boat adapted to support the machine while resting on the surface of the water. Under the arrangement shown in Fig. 2, I employ a biplane structure comprising superimposed planes or wings 55 and 56 connected by the usual struts 57. Stays 58 extend from the planes to the top of the aerostat and other stays 59 extend from the lower plane to the boat body 54. Stays 60 extend from the forward end of the aerostat to the forward end of the boat body 54. In the arrangement shown in Fig. 2, the wheel base hangers 61 are attached to the boat body 54 and slant upwardly therefrom so that only the lower portions of the wheels 62 project below the bottom of the boat body and are therefore only partially submerged when the boat is resting on the surface of the water. Twin engines 63 are mounted at opposite sides of the longitudinal center of the machine and drive twin propellers 64.

Under the arrangement shown in Fig. 3, I retain the boat body 54 and the aerostat 2 and also the same form of wheel base shown in Fig. 2, the machine being thus adapted for operation either on the water or on the land. Instead of forming the wings in the ordinary manner as shown in Figs. 1 and 2, the wings 65 comprise three or more main spars or bed rails 66 and intermediate lighter spars 67. The cloth or fabric 68 of the wings is fastened to the spars 66 and 67 and each wing structure is adapted to be folded after the manner of a bellows as illustrated in Fig. 4, the inner ends of the spars 65 being pivotally attached to the body and connected by gears 69 to insure proper folding. Flexible stays 70 extend from the outer end portions of the spars 66 upwardly to the belly band of the aerostat and other bottom stays 71 extend from the outer end portions of the spars 66 downwardly to cross heads 71' on the front axle of the wheel base. A flexible connection or cable 73 extends along the outer edge of each wing and extends from the rear trailing corner of the wing to the body at the point 75. By slacking the connections 73 and the stays 70 and 71, the wings may be folded against the body like a bellows and lashed to the sides of the body for storage for enabling the machine to be driven along a road or across a field in the same manner as an automobile. Under the arrangement shown in Fig. 3, the engine will be housed in the forward part of the body 54 and a tractor propeller will be driven thereby arranged at the prow of the body. Any suitable means may be used for maintaining and restoring lateral equilibrium.

I claim:—

In a flying machine, the combination of a body, wings extending on opposite sides of the body, an aerostat of dirigible balloon formation arranged above and in spaced relation to said body, connecting means between said aerostat and body, propelling means, directional means, each wing comprising a plurality of spars having pivotal connection with the body of the machine whereby the wing is adapted to be folded like a bellows and lashed to the body of the machine for transportation, and gears connecting the inner ends of said wing spars and controlling the relative folding and unfolding movements thereof.

In testimony whereof I affix my signature.

JOHN BARTO.